United States Patent [19]
Malan et al.

[11] Patent Number: 5,519,849
[45] Date of Patent: May 21, 1996

[54] METHOD OF REDUCING THE COMPLEXITY OF AN I/O REQUEST TO A RAID-4 OR RAID-5 ARRAY

[75] Inventors: Steven J. Malan, Woodland Park; Sid Snyder, Colorado Springs; David W. Thiel, Colorado Springs; Alan Rollow, Colorado Springs, all of Colo.

[73] Assignee: Digital Equipment Corporation, Maynard, Mass.

[21] Appl. No.: 329,046

[22] Filed: Oct. 25, 1994

Related U.S. Application Data

[63] Continuation of Ser. No. 987,459, Dec. 7, 1992, abandoned.

[51] Int. Cl.$^6$ ............................................. G06F 9/00
[52] U.S. Cl. .................................. 395/500; 395/441
[58] Field of Search ............................ 395/500, 600, 395/441; 364/425, 575; 325/275

[56] References Cited

U.S. PATENT DOCUMENTS

| | | | |
|---|---|---|---|
| 4,092,732 | 5/1978 | Ouchi | 395/182.03 |
| 4,434,487 | 2/1984 | Rubinson et al. | 371/10.2 |
| 4,775,978 | 10/1988 | Hartness | 371/40.1 |
| 4,914,656 | 4/1990 | Dunphy et al. | 371/10.2 |
| 4,989,205 | 1/1991 | Dunphy et al. | 395/182.04 |
| 4,989,206 | 1/1991 | Dunphy et al. | 395/182.05 |
| 5,072,378 | 12/1991 | Manka | 395/575 |
| 5,148,432 | 9/1992 | Gordon | 371/10.1 |
| 5,166,939 | 11/1992 | Jaffe et al. | 371/40.1 |
| 5,195,100 | 3/1993 | Katz et al. | 371/66 |
| 5,202,799 | 4/1993 | Hetzler et al. | 360/48 |
| 5,258,984 | 8/1995 | Menon | 371/10.1 |
| 5,301,297 | 8/1995 | Menon | 395/425 |
| 5,313,626 | 8/1995 | Jones | 395/575 |

OTHER PUBLICATIONS

"Software and Performance Issues in the Implementation of a RAID Prototype", Edward K. Lee, Report No. UCB/CSD, 90/573, May 1990, Computer Science Division, Univ. of California, Berkeley.

A Case for Redundant Array of Inexpensive Disks (RAID), David A. Patterson, Garth Gibson, Randy H. Katz, Report No. UCB/CSD 87/391, Dec. 1987, Computer Science Division (EECS), University of California, Berkeley, CA 94720.

A Case for Redundant Arrays of Inexpensive Disks (RAID), David A. Patterson, Garth Gibson, and Randy H. Katz, ACM SIGMOD Conference–Jun. 1– 3, 1988, Chicago, Illinois.

Two Papers on RAIDs, Peter Chen, Garth Gibson, Randy H. Katz, David A. Patterson, Martin Schulze, Report No. UCB/CSD 88/479, Dec., 1988, Computer Science Division (EECS), University of California, Berkeley, CA 94720.

An Introduction to RAID–Redundant Arrays of Inexpensive Disks, Peter McLean, Apr. 24, 1991, Digital Equipment Corporation–CXO1–2/N26.

A Queuing Analysis of RAID Architectures, Schenze Chen and Don Towsley, COINS Tech. Report 91–71, Department of Computer and Information Science, University of Massachusetts, Amherst, MA 01003.

The Digital Guide to RAID Storage Technology, 1992, Digital Equipment Corporation.

*Primary Examiner*—Robert B. Harrell
*Assistant Examiner*—Saleh Najjam
*Attorney, Agent, or Firm*—Arthur W. Fisher; Ronald C. Hudgens

[57] ABSTRACT

Data storage systems using a RAID-4 or RAID-5 organization divide an application I/O request into a number of individual I/O requests, each of which is contained within the boundaries of a single strip. The data blocks of each chunk on a strip responsive to an I/O request can form a complex geometric pattern requiring complicated operations to perform the I/O request. To simplify the necessary operations, each individual I/O request to a strip is divided into at most three requests targeted to data blocks forming a rectangle and each of these rectangles are processed as a unit. If a data block within a rectangle is unavailable, then the request to that rectangle is further subdivided into at most two requests targeted to data blocks forming smaller, non-overlapping rectangles which collectively are the original rectangle. The recursive decomposition of rectangles into smaller rectangles isolates the data block with an error and permits the selection of fewer and less complicated operation algorithms to complete the I/O request.

14 Claims, 10 Drawing Sheets

RAID – 5 ORGANIZATION

Fig. 3

RAID – 4 ORGANIZATION

Fig. 4

| | DISK 1 | DISK 2 | DISK 3 | DISK 4 | DISK 5 | |
|---|---|---|---|---|---|---|
| A | 0 | 12 | 24 | 36 | P | |
| B | 1 | 13 | 25 | 37 | P | |
| C | 2 | 14 | 26 | 38 | P | |
| D | 3 | 15 | 27 | 39 | P | |
| E | 4 | 16 | 28 | 40 | P | |
| F | 5 | 17 | 29 | 41 | P | STRIP 1 |
| G | 6 | 18 | 30 | 42 | P | |
| H | 7 | 19 | 31 | 43 | P | |
| I | 8 | 20 | 32 | 44 | P | |
| J | 9 | 21 | 33 | 45 | P | |
| K | 10 | 22 | 34 | 46 | P | |
| L | 11 | 23 | 35 | 47 | P | |

Fig. 5

| | DISK 1 | DISK 2 | DISK 3 | DISK 4 | DISK 5 | |
|---|---|---|---|---|---|---|
| A | 0 | 12 | 24 | 36 | P | |
| B | 1 | 13 | 25 | 37 | P | |
| C | 2 | 14 | 26 | 38 | P | |
| D | 3 | 15 | 27 | 39 | P | |
| E | 4 | 16 | 28 | 40 | P | |
| F | 5 | 17 | 29 | 41 | P | STRIP 1 |
| G | 6 | 18 | 30 | 42 | P | |
| H | 7 | 19 | 31 | 43 | P | |
| I | 8 | 20 | 32 | 44 | P | |
| J | 9 | 21 | 33 | 45 | P | |
| K | 10 | 22 | 34 | 46 | P | |
| L | 11 | 23 | 35 | 47 | P | |

METHOD OF REDUCING THE COMPLEXITY OF AN I/O REQUEST TO A RAID-4 OR RAID-5 ARRAY

This application is a continuation of application Ser. No. 07/987,459, filed Dec. 7, 1992, now abandoned.

FIELD OF THE INVENTION

Data storage systems using a RAID-4 or RAID-5 organization typically divide an application I/O request into a number of individual I/O requests, each of which is contained within the boundaries of a single strip and then process each of these individual I/O requests as a unit. The data blocks of each chunk on a strip responsive to an I/O request can form a complex geometric pattern and, accordingly, the details of operations performed on the strip are complicated, particularly when error recovery is included. The present invention is a method of organizing a RAID-4 or RAID-5 implementation to reduce the complexity of the geometry of the data blocks on a strip responsive to an I/O request.

BACKGROUND OF THE INVENTION

RAID (Redundant Array of Independent/Inexpensive Disks) is an organization of data on a plurality of disks which results in enhanced data availability and performance. As is well known, there are several levels of RAID organization with different characteristics that affect both performance of the array and availability of the data. One performance enhancing feature of RAID is "striping" which spreads user data across the disks in the array. Each disk in the RAID array is referred to as a member of the array. The user data is broken down into segments referred to as "chunks." A chunk is a group of consecutively numbered blocks that are placed consecutively on a single disk before placing blocks on a different disk. A block is the smallest unit that can be read or written to a disk. Thus, a chunk is the unit of data interleaving for a RAID array. For example, in a four disk RAID array the first chunk is placed on the first disk, the second chunk is placed on the second disk, the third chunk is placed on the third disk, the fourth chunk is placed on the fourth disk, the fifth chunk is placed on the first disk and so on.

RAID enhances data availability through data redundancy. In RAID level 4 (RAID-4) and RAID level 5 (RAID-5) data redundancy is achieved by "parity." Parity involves the use of error correction codes (ECC) such as Exclusive-OR or Reed-Solomon. Parity data is stored in the RAID array and is used to reconstruct the data if a disk fails or a data block otherwise becomes unavailable.

RAID-4 and RAID-5 are organizations of an array of n+1 disks that provide enhanced performance through the use of striping and enhanced data availability through the association of a parity block with every n data blocks. The data and parity information is distributed over the n+1 disks so that if a single disk fails or a data block on another disk is unreadable, all of the data can be recovered. RAID-4 is a level of organization for a RAID array where data blocks are arranged into chunks which are interleaved among the disks and protected by parity and all of the parity is written on a single disk. RAID-5 is a level of organization of data for a RAID array where data blocks are arranged into chunks which are interleaved among the disks and protected by parity and the parity is distributed over all of the disks in the array. In both RAID-4 and RAID-5 the ensemble or array of n+1 disks appears to the user as a single, more highly available virtual disk.

The contents of each bit of the parity block is the Exclusive-OR of the corresponding bit in each of the n corresponding data blocks. In the event of the failure of a single disk in the array, the data from a given data block on the failed disk is recovered by computing the Exclusive-OR of the contents of the corresponding parity blocks and the n−1 data blocks on the surviving disks that contributed to the parity block. The same procedure is followed if a single block or group of blocks is unavailable. A block or set of blocks is repaired by writing the regenerated data. The regeneration and repair of data for a data block or set of data blocks and the associated parity block on a disk in a RAID array is referred to as reconstruction.

RAID storage systems can be implemented in hardware or software. In the hardware implementation the RAID algorithms are built into a controller that connects to the computer I/O bus. In the software implementation the RAID algorithms are incorporated into software that runs on the main processor in conjunction with the operating system. Both the hardware and software implementations of RAID are well known to those of ordinary skill in the field.

A single application I/O request is typically for a continuous range of blocks on the "virtual" disk presented by the array. Thus, a single application I/O request can span multiple strips. A strip is a single parity chunk and all of the data chunks that contribute to it. As is well known to those of ordinary skill in the field, RAID implementations typically divide an application I/O request into a plurality of I/O requests, each of the divided I/O requests is contained within the boundaries of a single strip and each of these divided I/O requests is processed as a unit.

In the context of a single strip, a single I/O request can target a complicated geometry or pattern of data blocks. A high performance implementation of a RAID-4 or RAID-5 array uses a number of different algorithms to read and write data from the array. These operations include simple read, read modify write, reconstruct write, regenerate read repair, and non-redundant write. Each of these operations is well known to one of ordinary skill in the field. The specific algorithm to use for a particular geometric pattern of data blocks depends upon a variety of factors including whether the operation is a write or read, the number of chunks involved and whether the array is complete or is missing a disk. Thus, dealing with the complexities of error recovery and the efficient implementation of a multiplicity of read and write algorithms, each tuned for a different set of scenarios is complicated by the many patterns that a single read or a single write operation can target. Accordingly, it is desirable to reduce the complexity of the geometry of the data blocks on a strip responsive to an I/O request.

SUMMARY OF THE INVENTION

The present invention is a method of organizing a RAID-4 or RAID-5 implementation by reducing the complexity of the geometry of the data blocks on a strip targeted by an I/O request. A read/write operation (I/O request to a complex pattern of data blocks on a strip of the RAID array is decomposed or transformed or mapped into read/write operations to at most three rectangular patterns of data blocks on the strip. Each rectangular pattern of data blocks, referred to as a rectangle, is processed as a unit. Each read/write operation to a rectangular pattern of data blocks containing an unavailable data block is further decomposed into two rectangular patterns of data blocks, referred to as sub-rectangles or clone rectangles, for error recovery. The number of such decompositions is unlimited. The read/write operation to data blocks forming a rectangle or clone rectangle are simplified in the selection and sequence of the basic well known RAID algorithms needed to complete the operation as compared to the algorithms and sequence needed for the complex pattern of data blocks targeted by the original read/write operation. The method of the present invention thus achieves a high degree of availability for the contents of the RAID array.

RAID-4 and RAID-5 are closely related organizations of an array of disks that provide enhanced performance through the use of striping and enhanced availability through the association of a parity block with every n data blocks. The data and parity information is distributed over n+1 disks so that if a single disk fails or if a single block or group of blocks is unavailable, all of the data can be recovered. The ensemble of n+1 disks appears to a user application as a single more highly available "virtual" disk. The contents of each bit of the parity block is the Exclusive-OR of the corresponding bit in each of the n corresponding data blocks. In the event of the failure of a single disk, the data information from a given data block on the failed disk is recovered by computing the Exclusive-OR of the contents of the corresponding parity block and the n−1 data blocks on the surviving disks that contributed to that parity block. The same procedure is followed if a single block or group of blocks is unavailable.

A single application I/O request is frequently for a contiguous range of blocks on the "virtual" disk presented by the array. A single I/O request can span multiple strips of the RAID array. RAID implementations typically divide an application I/O request into a number of I/O requests with each of the divided I/O requests contained within the boundaries of a single strip. Each of the divided requests are then processed as a unit.

An implementation of a RAID-4 or RAID-5 array deals with the failure of a single disk by allowing the application requests to continue using only the surviving disks. It also provides for the recovery from the inability to read or write individual blocks of a disk due to sector read or write errors in a manner that preserves, to the greatest possible extent, the ability of an application to read and write data. Throughout the detailed description, any reference to an unavailable or failed disk is equally applicable to unreadable block or groups of blocks even though the entire disk is not unavailable.

A read or write application request frequently maps to a complex geometric pattern of data blocks in the strip. A different but well known algorithm is used to read or write data from the array depending upon a number of factors including but not limited to whether the RAID array is complete or missing a disk, whether the missing disk contains targeted data, parity information corresponding to the targeted data or neither of these, and the number of disks targeted by the operation. These operations include simple read, read modify write, reconstruct write, regenerate read repair, and non-redundant write. Each of these operations are well known to those of ordinary skill in the field. The complexity of the geometric pattern of data blocks involved in a read or write operation further complicates the error recovery.

In the present invention, each I/O request to a strip in the RAID array which targets data blocks forming a complex geometric pattern on the strip is divided into at most three requests, each of which targets data blocks forming a rectangle on the strip. No more than three rectangles are ever required within a single strip to represent any contiguous range of data blocks in the original I/O request. A rectangle is a subset of the data blocks of a strip, where the included disks are logically adjacent and where exactly equivalent portions of each of the included disks are involved.

Since a "rectangle" has a simple and regular geometry, the algorithms needed for an effective RAID array are simplified. In addition, a request to a "rectangle" can be further subdivided into two requests to data blocks forming smaller, non-overlapping rectangles which are collectively the "original rectangle." The requests to the data blocks forming each of the subdivided rectangles are processed independently in order to simply and effectively manage the recovery from an error.

BRIEF DESCRIPTION OF THE DRAWINGS

Other advantages of the invention will become apparent upon reading the following detailed description and upon reference to the accompanying drawings, in which.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE DRAWINGS

Figure 1:
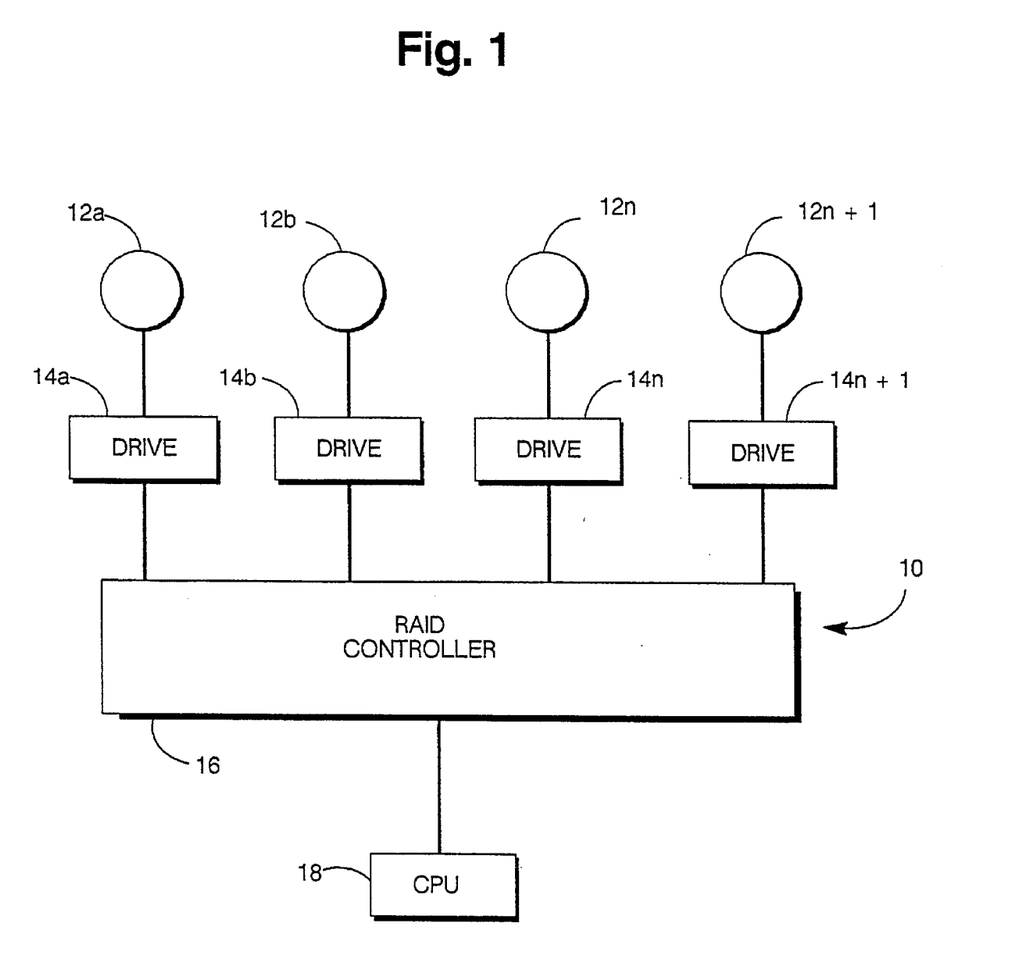
FIG. 1 is a typical storage system using a RAID array organized for implementing the present invention.

FIG. 1 is an illustration of a storage system 10 in which an array of n+1 disks 12 and associated drives 14 are connected to a RAID controller 16. A user, such as CPU 18, gains access to the n+1 disks 12 via normal read and write commands. The n+1 disks 12 are arranged into either a RAID-4 or RAID-5 organization based upon the selection of the well known RAID algorithms implemented in the RAID controller 16. The present invention is also usable with a distributed host based RAID array.

RAID-4 and RAID-5 are closely related organizations of the n+1 disks 12 that provide enhanced performance through the use of striping and enhanced availability through the association of a parity block with every n data blocks. The data and parity information is distributed over the array of n+1 disks 12 so that if any single disk fails or otherwise becomes unavailable all of the data and/or parity information on the unavailable disk can be recovered. In the RAID-4 organization, all parity data is on a single disk and in the RAID-5 organization, the parity information is distributed over all of the disks in the array.

All access to the array of n+1 disks 12 is through the RAID controller 16 which is connected to the user application such as CPU 18. A single CPU is shown but using a plurality of CPU's is well within the ability of someone of ordinary skill in the field. The RAID controller 16 contains the standard RAID algorithms which are well known to one of ordinary skill in the art.

The array of n+1 disks 12 appears as a single, more highly available virtual disk to a user. The contents of each bit of the parity block is the Exclusive-OR of the corresponding bit in each of the n corresponding data blocks. As is well known, other error correction codes can be used to establish the mathematical relationship between the data and parity information. In the event of the failure or unavailability of a single disk in the array of n+1 disks 12, the data from a given data block on the unavailable disk is regenerated by computing the Exclusive-OR of the contents of the corresponding parity block and the n−1 data blocks on the remaining disks in the array that contributed to that parity block. The unavailable data block is repaired, if possible, by writing the regenerated data. In this manner an entire unavailable disk can be reconstructed by regenerating data and repairing data blocks and parity blocks. Of course, the unavailable disk can be removed and a replacement disk substituted and the regenerated data is then written on the replacement disk to bring the RAID array back to fully redundant operation.

A RAID-4 or RAID-5 array is organized as a collection of strips, each of which contains a set of blocks or a chunk from each disk in the array. One of the chunks in a strip contains the parity for the other chunks in the strip. In a RAID-5 organization parity chunks are located on different disks of the array in successive strips. In a RAID-4 organization all parity chunks are located on the same disk in the array.

Figure 2:
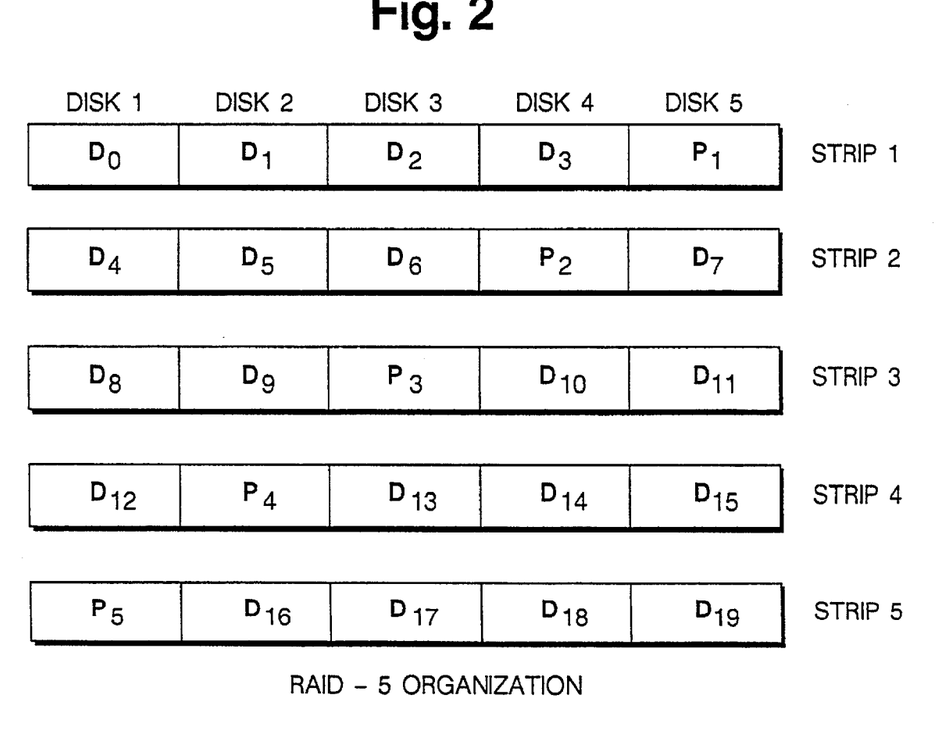
FIG. 2 is an illustration of the strips comprising a five disk storage system organized according to RAID-5.

FIG. 2 illustrates five strips of a five disk RAID array organized according to RAID-5. A plurality of data blocks forming data chunk $D_0$ are located on Disk 1, another plurality of data blocks forming data chunk $D_1$ are located on Disk 2, another plurality of data blocks forming data chunk $D_2$ are located on Disk 3, another plurality of data blocks forming data chunks $D_3$ are located on Disk 4 and another plurality of blocks forming parity chunk $P_1$ are located on Disk 5. The remaining strips are organized in a similar fashion with the parity chunk for the data chunks of each strip being located on a different disk than the preceding or following strip.

Parity chunk $P_1$ is a set of blocks that are the Exclusive-OR parity of the sets of data blocks or chunks $D_0$, $D_1$, $D_2$ and $D_3$. The other parity chunks are similarly identified. Each chunk of data is a consecutively indexed set of blocks on the underlying disk. There are various patterns of data and parity in successive strips that are well known and these differences are irrelevant to the present invention. The data on the virtual disk that is presented by the array is stored on the data blocks in the order $D_0$, $D_1$, $D_2$, $D_3$, $D_4$, etc. Accordingly, ascending data addresses first cover a chunk, then a strip and finally move to the next strip.

Figure 3:
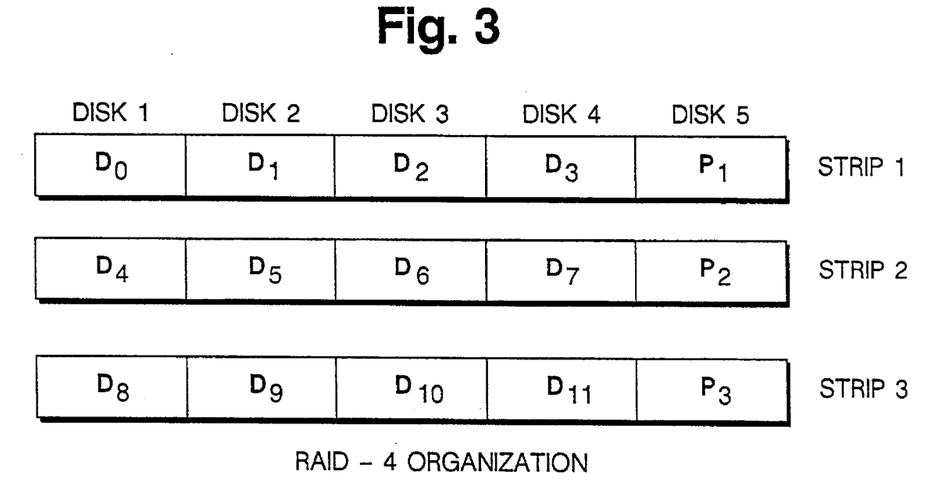
FIG. 3 is an illustration of the strips comprising a five disk storage system organized according to RAID-4.

FIG. 3 is an illustration of three strips of a five disk RAID array organized according to RAID-4. As is well known, the parity chunks $P_1$, $P_2$, and $P_3$ for each strip are located on the same disk in the array. Accordingly RAID-5 is essentially a generalization of RAID-4 where the location of data and parity chunks within a strip is defined according to some algorithm that is controlled by the index of the strip within the array.

The purpose of the invention is to transform operations on a RAID-4 or RAID-5 strip into operations on "rectangles" within strips. A "rectangle" is an array of vectors of blocks, all of the blocks in a vector are in the same strip and contribute to the same parity. In addition, when a data block is unavailable because of a failed disk or otherwise, the present invention coordinates the choice and sequence of the basic operations in order to achieve a high degree of availability for the contents of the RAID array. All I/O operations are decomposed into rectangle operations on strips. No more than three rectangles are required for any strip in the decomposition of any operation on a contiguous sub-vector of the RAID-5 array.

Since RAID-5 is essentially RAID-4 with the mapping of the chunks of each strip onto the array members or disks permuted in an algorithmic manner, the description will proceed in terms of a single RAID-4 strip, without any loss of generality.

In a RAID-4 array with n+1 disks, numbered 1 through n+1, the data blocks are in increasing order on disks 1 through n and the associated parity is on disk numbered n+1. A rectangle is then described as a tuple, whose elements are:

a) Horizontal Offset: the first, or lowest numbered disk that contains data for this rectangle;

b) Width: the number of disks that contain data for this rectangle;

c) Vertical Offset: block offset into the chunk of the first block of data in the rectangle; and d) Height: number of blocks on a single chunk.

Figure 4:
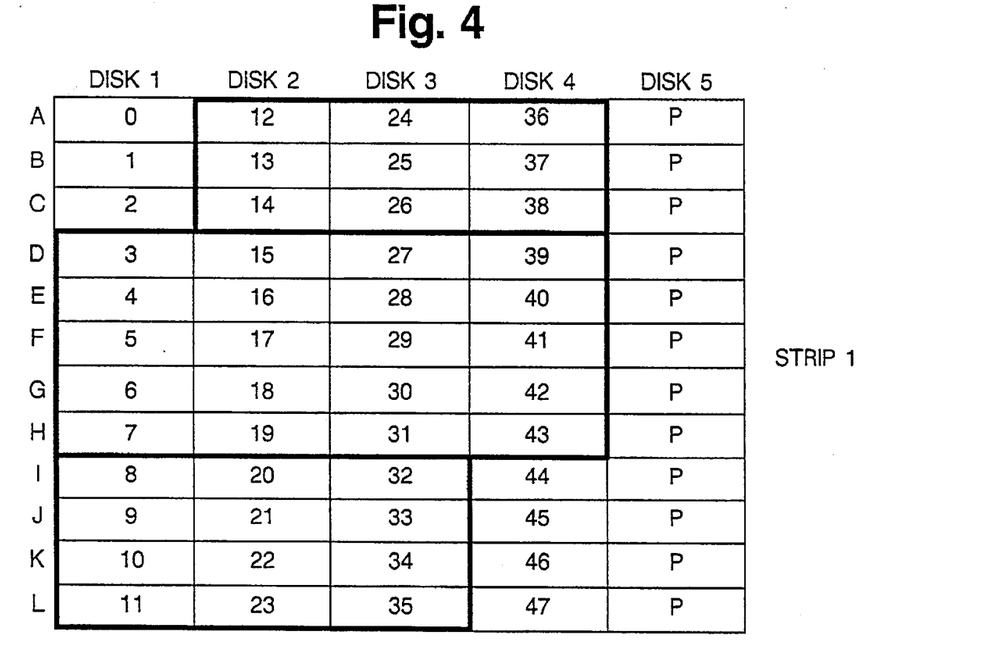
FIG. 4 is an illustration of the decomposition of a complex geometric pattern of data blocks into rectangles to be processed in response to a request from an application.

FIG. 4 illustrates how an I/O operation is broken down into rectangles in a strip of a five disk or member RAID array, organized into RAID-4. Each disk has a chunk size of twelve blocks, namely A through L. A forty-one (41) block I/O operation beginning at the fourth block of the first disk is broken down into three rectangles. The first rectangle is identified as the one with the smallest number beginning block, the second rectangle is identified as the one with the next smallest number beginning block, and the third rectangle is identified as the one with the largest number beginning block. Thus, the first rectangle is defined by the blocks D1 through H4; the second rectangle is defined by the blocks I1 through L3; and the third rectangle is defined by the blocks A2 through C4. As defined above, the Horizontal Offset of the first rectangle is 0, its Width is 4, its Vertical Offset is 3 and its Height is 5. Similarly, the Horizontal Offset of the second rectangle is 0, its Width is 3, its Vertical Offset is 8 and its Height is 4. Finally, the Horizontal Offset of the third rectangle is 1, its Width is 3, its Vertical Offset is 0 and its Height is 3.

The choice of the type of read or write operation to be applied to a rectangle is determined by the state of the RAID array relative to the rectangle and the error or errors, if any, that have been determined (hereinafter referred to as the state of the rectangle). The five states are as follows:

1) Not reduced, the rectangle spans at least half of the data members;

2) Not reduced, the rectangle spans fewer than half of the data members;

3) Reduced, a missing disk holds parity for the rectangle;

4) Reduced, a missing disk holds data outside the rectangle; and

5) Reduced, a missing disk holds data inside the rectangle.

The term reduced means that the array is missing one member.

There are five read and write operations, which are well known to those of ordinary skill in the field as follows:

1) Simple read (SR);

2) Regenerate read repair (RRR);

3) Read modify write (RMW);

4) Reconstruct write (RW); and

5) Non-redundant write (NRW).

Figure 5:
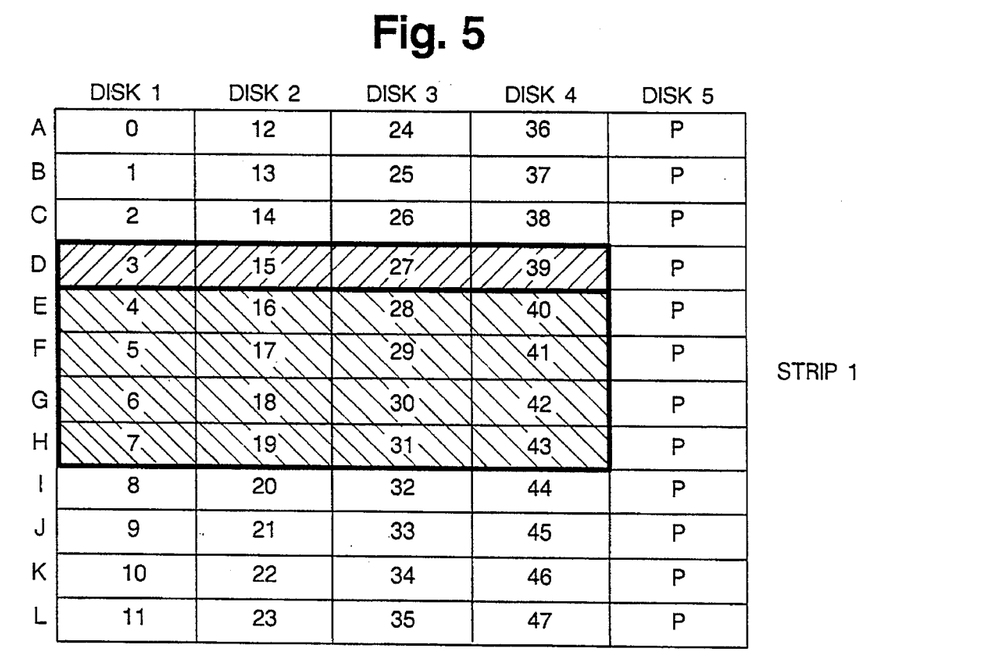
FIG. 5 is an illustration of the further decomposition of one of the rectangles from FIG. 4 to treat error recovery.

To attempt recovery from a failed operation, a rectangle containing the unavailable data block is subdivided into two rectangles. FIG. 5 illustrates the first rectangle R from FIG. 1 in which data block 40 is unavailable. The two subdivided or clone rectangles are defined as R1 containing D1 through D4 and R2 containing E1 through H4. Each clone rectangle has the same horizontal offset and same width as the original rectangle.

R1 contains data blocks that were successfully read and/or written (available) and is referred to as the success rectangle. The Vertical Offset of R1 is the Vertical Offset at R. The Height of R1 is the lowest vertical block offset into R of any error. Of course, the Height of R 1 may be zero. R2 contains the block at the lowest Vertical Offset with an error. The Vertical Offset of R2 is the sum of the Vertical Offset of R1 and the Height of R1. The Height of R2 is 4. After the rectangle R is subdivided as described above, each of the rectangles R1 and R2 are acted upon independently. The state of the RAID array with respect to the rectangle at the time that error recovery action is being considered determines which read/write algorithm is used. The state of the rectangle with respect to the original rectangle R when the error occurred is irrelevant.

Figure 6A:
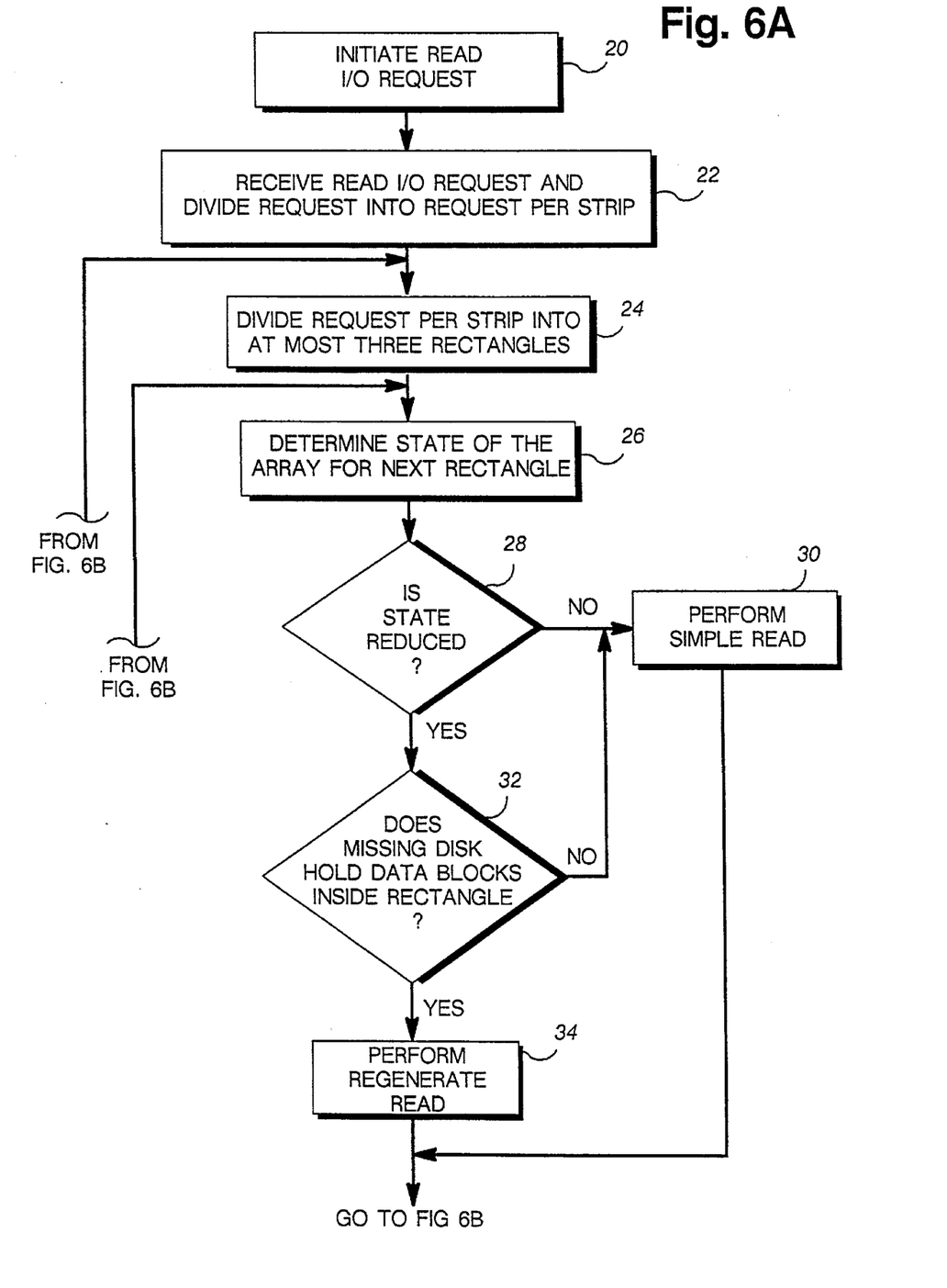
FIGS. 6A and 6B are flow charts illustrating the process of the present invention for a read I/O request.
Figure 6B:
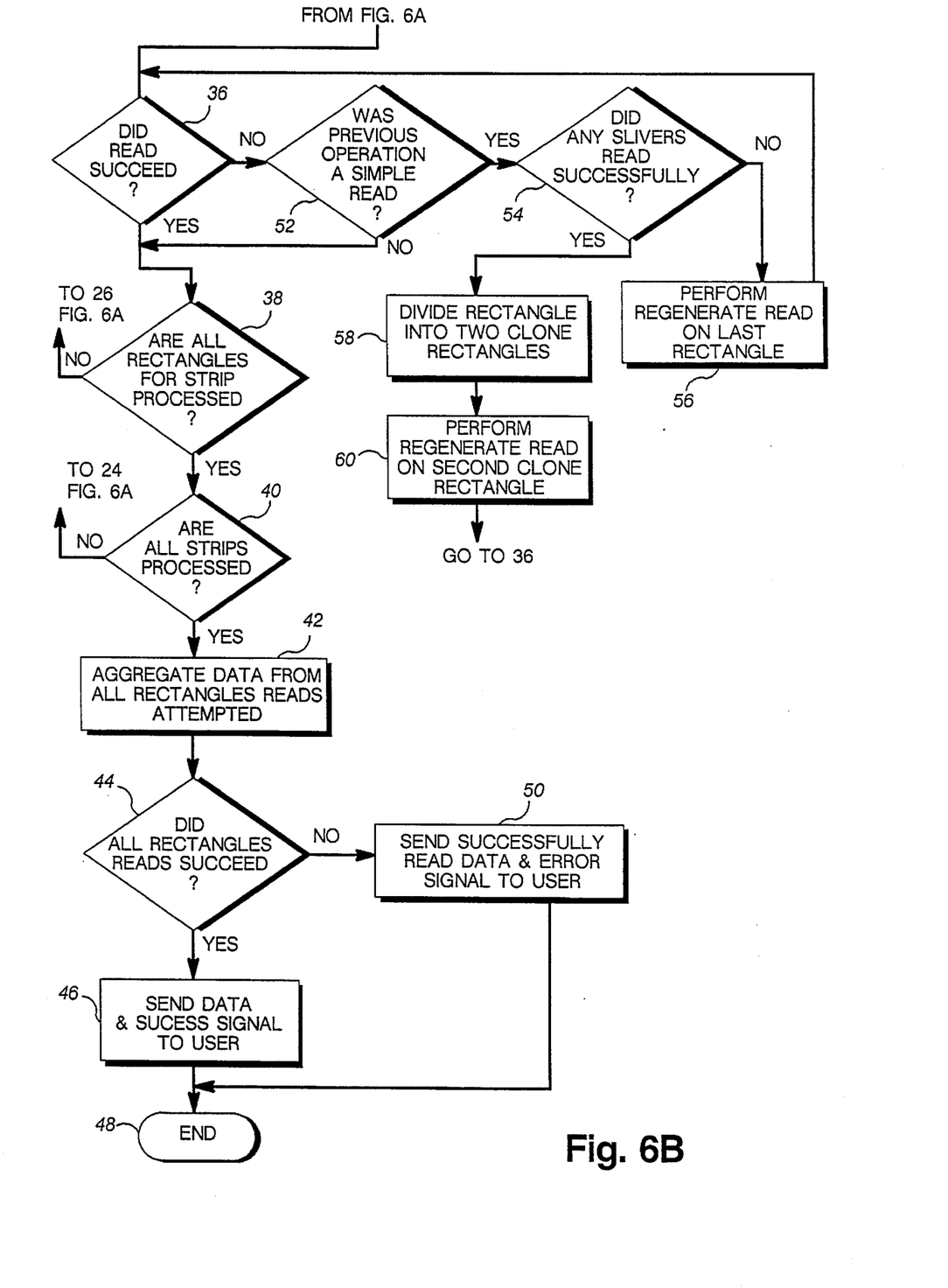

FIGS. 6A and 6B are flow charts illustrating the process of reducing the complexity of the geometry of the data blocks on a strip responsive to a read I/O request. A user or client application, such as CPU 18 of FIG. 1 initiates a read I/O request at step 20. The read I/O request is received by the RAID controller 16 which divides the read I/O request into a plurality of read I/O requests at step 22 as is well known to those of ordinary skill in the field. Each divided read I/O request involves data blocks located in a single strip. At step 24 the data blocks in a single strip responsive to the read I/O request are divided into at most three "rectangles." The method of dividing the I/O request into at most three rectangles is described hereinafter with reference to FIGS. 8A and 8B. At step 26, the state of the first rectangle is determined. The various possible states for the rectangle have been described above. If the state of the first rectangle is not reduced as determined at step 28, then a simple read operation is performed at step 30. If the state of the first rectangle is reduced as determined at step 28 and a missing disk does not have data blocks inside the rectangle as determined at step 32 then a simple read operation is performed at step 30. If the state of the first rectangle is reduced as determined at step 28 and a missing disk holds data blocks inside the rectangle as determined at step 32 then a regenerate read operation is performed at step 34. After the simple read operation at step 30 or the regenerate read operation at step 34, the process proceeds to FIG. 6B.

- If the read operation for the first rectangle is successful at step 36 the process proceeds to step 38 to determine if all rectangles have been processed for this strip. If there is a rectangle remaining the process loops back to step 26 to determine the state of the next rectangle, in the present example the second rectangle. The same process as described above continues for the second rectangle. If the read rectangle process for the data blocks of the second rectangle is successful as determined at step 36, the process proceeds to step 38 to determine if any rectangles remain for this strip. If there is a rectangle remaining the process loops back to step 26 and the state of the next rectangle is determined, in the present example the third rectangle. The same process as described above continues for the third rectangle. If the read rectangle for the third rectangle is successful as determined at step 36, the process continues at step 38 to determine if any rectangles remain. If no rectangles remain the process proceeds to step 40 to determine if all strips affected by the I/O request have been processed. If an affected strip remains the process loops back to step 24 to divide the I/O request for the next strip into at most three rectangles and the above process is repeated. If all strips have been processed at strip 40, then at step 42 the aggregate data from the read rectangles which were attempted is collected. Now at step 44 it is determined if all the read rectangle operations were successful. If all of the read rectangles were successful then at step 46 the read data is sent to the user application together with a success signal and the read I/O request successfully ends at step 48. If all of the read rectangle operations were not successful at step 44, then the data from the successful rectangle read operations together with an error signal is sent to the user application at step 50 and the read I/O request ends unsuccessfully at step 48. If one of the above described three read rectangle operations is unsuccessful as determined at step 36, then at step 52 the type of the previous read operation is determined. If the previous read operation was not a simple read the process proceeds to step 38 to determine if all rectangles for the strip have been processed and then proceeds as described above. If the previous read operation was a simple read then at step 54 it is determined if any slivers of the rectangle read successfully. The operation set forth at step 54 can, as an alternative, be performed in place of step 52 and, if no slivers were read successfully, then if the previous operation was a simple read, continue at step 56, otherwise continue at step 38. A sliver is a set of blocks consisting of a single parity block and all of the logical blocks contributing data to that parity block. If no slivers read successfully then at step 56 a regenerate read operation is performed on the last rectangle and the process loops back to step 36 to determine if the read operation was successful and then proceeds as described above. If at least one sliver read successfully as determined at step 54, then the rectangle is divided into two clone or sub-rectangles at step 58. The process of dividing the rectangle into two clone rectangles is described hereinafter with reference to FIG. 9. Next, a regenerate read operation is performed on the second clone rectangle at step 60 and the process loops back to step 36 to determine if the read was successful and then proceeds as described above. Thus the process continues with a recursive decomposition for error recovery. The number of recursive divisions of requests into sub-rectangles or clone rectangles is a matter of design choice and any number of divisions can be implemented by following the teachings of the present invention.

Using the example set forth in FIGS. 4 and 5, the received read I/O request is divided into separate read I/O requests at step 22. The geometry for the data blocks in the strip is complex and I/O request would be complicated as explained above. In accord with the present invention, the I/O request to the data blocks in the strip is divided into requests to at most three rectangles at step 24. The method of dividing the I/O request is described with references to FIGS. 8A and 8B. The state of the first rectangle is determined at step 26 to be not reduced with the rectangle spanning at least half of the data members. Since the state is not reduced as determined at step 28, the data blocks of the first rectangle are processed with a simple read operation at step 30. Since there is an unavailable data block at E4 the simple read operation on rectangle one is unsuccessful as determined at step 36. Since the previous operation was a simple read as determined at step 52 the successful read of any slivers is determined at step 54. Since the D sliver was successful the rectangle is divided into two clone rectangles at step 58 as described in detail with reference to FIG. 9. The first clone rectangle is data blocks D1 through D4 and the second clone rectangle is E1 through H4. Next, a regenerate read operation is performed on the second clone rectangle, namely E1 through H4 at step 60. Now, the process loops back to step 36 to determine if the read portion of the algorithm was successful. If the read was successful then the process proceeds to step 38 as described above. If the read portion of the operation is unsuccessful at step 36 then since the previous operation was not a simple read as determined at step 52 the process proceeds to step 38 to determine if all rectangles for the strip have been processed. There are two remaining rectangles as determined at step 38 so the process loops back to step 26. The state of the second rectangle is determined at step 26 to be not reduced and spanning at least half of all data members. Since the second rectangle is not reduced at step 28 then a simple read operation is performed at step 30. The simple read operation is successful as determined at step 36 and, since the third rectangle remains at step 38, the process loops back to step 26. The state of the third rectangle is determined at step 26 to be not reduced and spanning at least half of all data members. Since the third rectangle is not reduced at step 28 a simple read operation is performed at step 30. The simple read is successful as determined at step 36 and, since there are no remaining rectangles as determined at step 38, the process proceeds to step 40 to determine if all of the affected strips have been processed. If there are strips remaining, the process loops back to step 24 to divide the request for the next strip into at most three rectangles. If all of the strips affected by the I/O read request have been processed, then all of the data from all of the rectangle read operations attempted are collected at step 42. Since all read rectangles succeeded as determined at step 44 the read data is sent to the user application together with a success signal at step 46 and the I/O read request to the strip ends successfully at step 48.

Figure 7A:
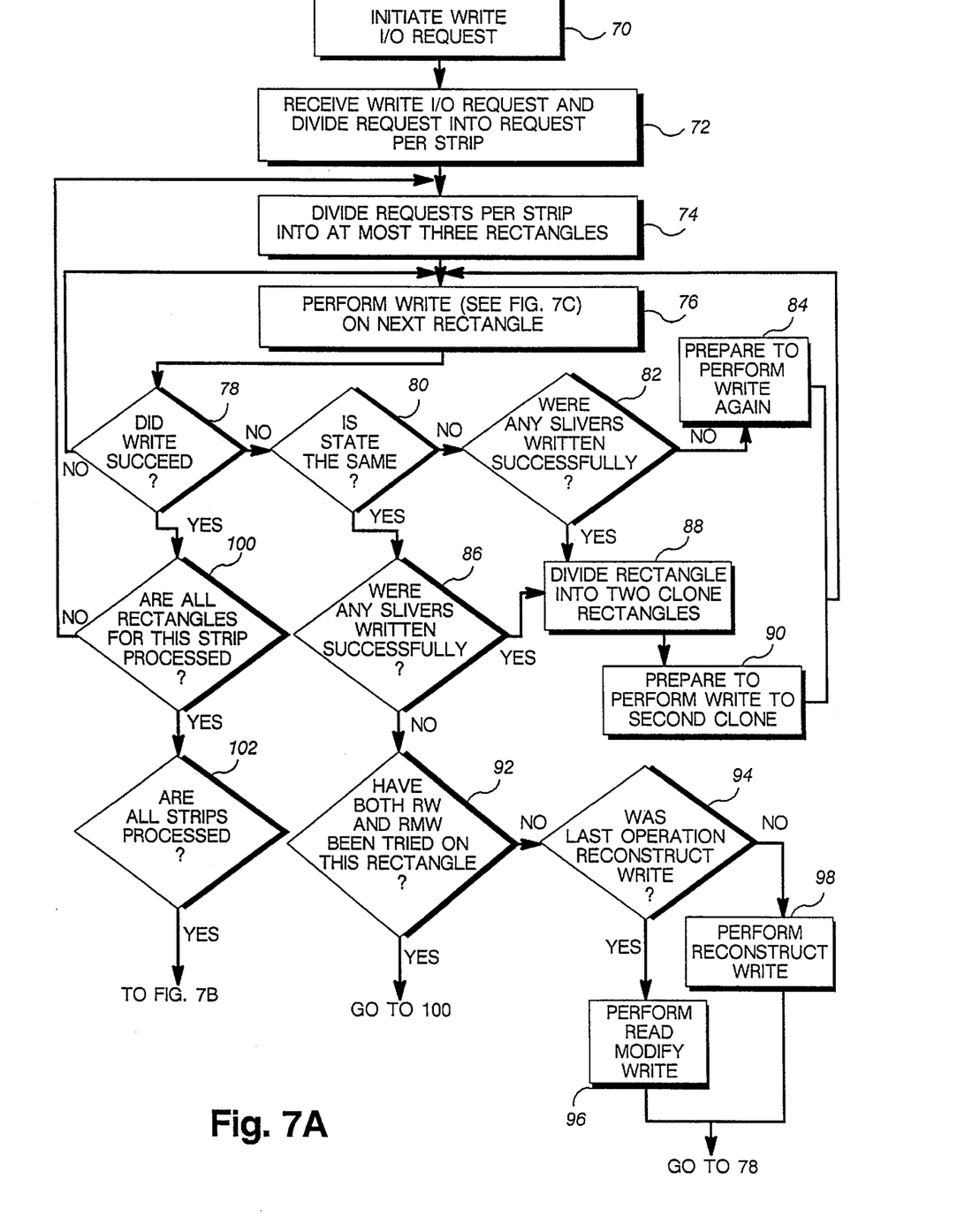
FIGS. 7A, 7B and 7C are flow charts illustrating the process of the present invention for a write I/O request.
Figure 7B:
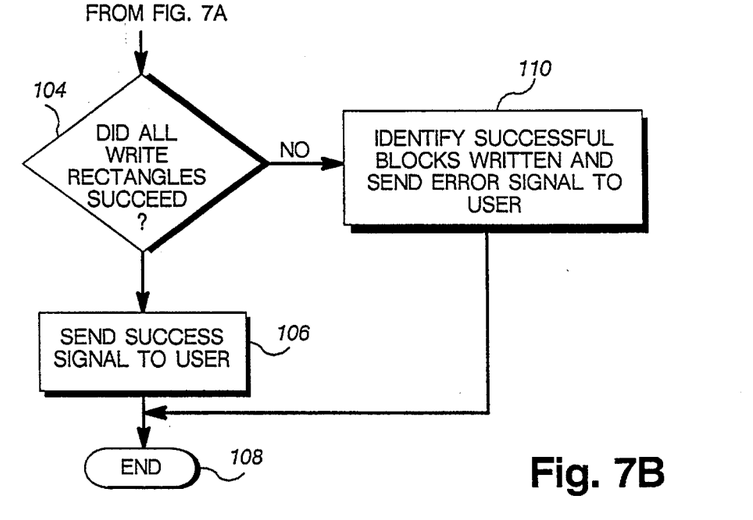

FIGS. 7A and 7B are flow charts illustrating the process of reducing the complexity of the geometry of the data blocks on a strip responsive to a write I/O request. A user or client application, such as CPU 18 of FIG. 1, initiates a write I/O request at step 70. The write I/O request is received by the RAID controller 16 which divides the write I/O request into a plurality of write I/O requests at 72 as is well known to those of ordinary skill in the field. Each divided write I/O request involves data blocks located in a single strip. At step 74 the data blocks in a single strip responsive to the write I/O request are divided into at most three rectangles. The method for dividing the I/O requests to the strip into at most three rectangles is described with reference to FIGS. 8A and 8B.

At 76 a write operation is performed. The write operation is described in detail hereinafter with reference to FIG. 7C. The success of the write operation is determined at step 78.

If the write operation was unsuccessful, then at step 80 the process determines if this is the first attempt to write to the rectangle by comparing the state of the rectangle to the previous rectangle state. If the state is not the same, then at step 82 the process determines if any slivers were written successfully. A sliver is the group of blocks occupying the same relative position on each disk or member of the array. If no slivers were written successfully then at step 84 the process prepares to attempt the write operation again and loops back to step 76 to perform a write operation again. If the write operation is again unsuccessful as determined at step 78, the state of the rectangle is determined to be the same at step 80. At step 86 the process determines if any slivers were written successfully. If at least one sliver was successfully written as determined at step 86 or as determined at step 82 during the first pass as written to the rectangle, then the rectangle is divided into two sub-rectangles or clone rectangles at step 88. The process of dividing the rectangle is described in detail hereinafter with reference to FIG. 9. Now, the process prepares to write to the second sub-rectangle at step 90 and the process loops back to step 76 to perform a write operation to the sub-rectangle. The recursive decomposition continues following the above process until at step 86 it is determined that no slivers were written to successfully, then at step 92 the process determines if both reconstruct write (RW) and read modify write (RMW) have been attempted with the rectangle. If both write operations have not been attempted, at step 94 the process determines if the last write operation was a reconstruct write. If the last write operation was a reconstruct write then at step 96 a read modify write (RMW) operation is performed. If the last operation was not a reconstruct write then a reconstruct write operation is performed at step 98. After either step 96 or 98 the process loops back to step 78 to determine if the write operation succeeded. If the write operation did not succeed, as determined at step 78, then the state of the rectangle is determined to be the same as the rectangle previously written to at step 80. Now at step 86 it is determined that no slivers were successfully written and at step 92 that both reconstruct write and read modify write operations have been attempted and the process ends the error recovery routine and loops back to step 100 to determine if all rectangles of this strip have been processed. Of course, if a write operation was successful as determined at step 78 the process also proceeds to step 100. If there are rectangles remaining in the strip that have not been processed, then the process loops back to step 76 and continues as described above. If all rectangles of the strip have been processed then at step 102 it is determined if all strips corresponding to the original I/O write have been processed. If a strip remains unprocessed then the method loops back to step 74 to divide that strip into three rectangles and the process continues as described above. If all of the strips of the original I/O request have been processed, then the method proceeds to FIG. 7B.

Referring to FIG. 7B, at step 104 it is determined if all write operations were successful. If all write operations were successful a write success signal is sent to the user at step 106 and the process ends at step 108. If all the write operations were not successful as determined at step 104, then the successfully written blocks are identified and an error signal sent to the user at step 110 and the process ends at step 108.

Figure 7C:
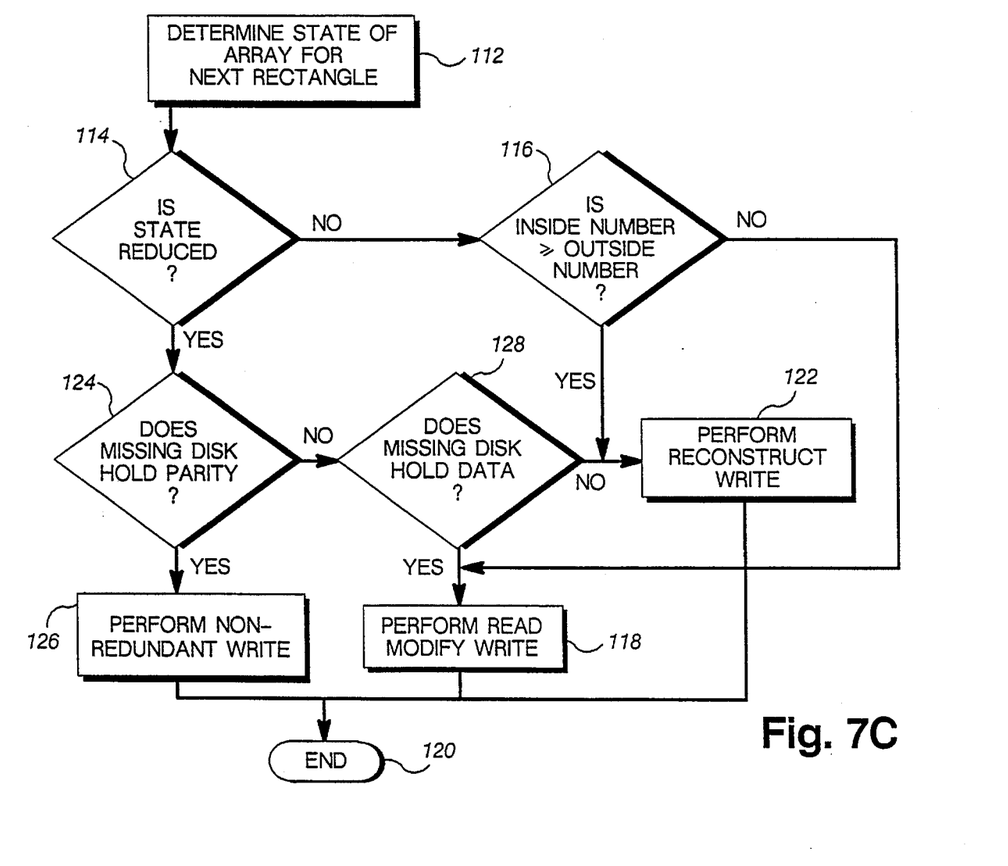

The write operation at step 76 is described with reference to FIG. 7C. At step 112 the state of the rectangle is determined. If the state of the rectangle is not reduced as determined at step 114, then at step 116 it is determined if the number of members inside the rectangle is greater than or equal to the number of members outside the rectangle. If the number of members inside the rectangle is not greater than or equal to the number of members outside the rectangle, then at step 118 a read modify write operation is performed and the write operation ends at step 120. If the number of members inside the rectangle are greater than or equal to the number of members outside the rectangle then a reconstruct write operation is performed at step 122 and the write operation ends at step 120.

If the state of the rectangle is reduced as determined at step 114, then it is determined if the missing disk holds parity for the rectangle at step 124. If the missing disk does hold parity for the rectangle then at step 126 a non-redundant write operation is performed and the write operation ends at step 120. If the missing disk does not hold parity for the rectangle as determined at step 124, then it is determined if the missing disk holds data outside the rectangle at step 128. If the missing disk holds data outside the rectangle then a read modify write operation is performed at step 118 and the write operation ends at step 120. If the missing disk does not hold data outside the rectangle then a reconstruct write operation is performed at step 122 and the write operation ends at step 120.

Figure 8A:
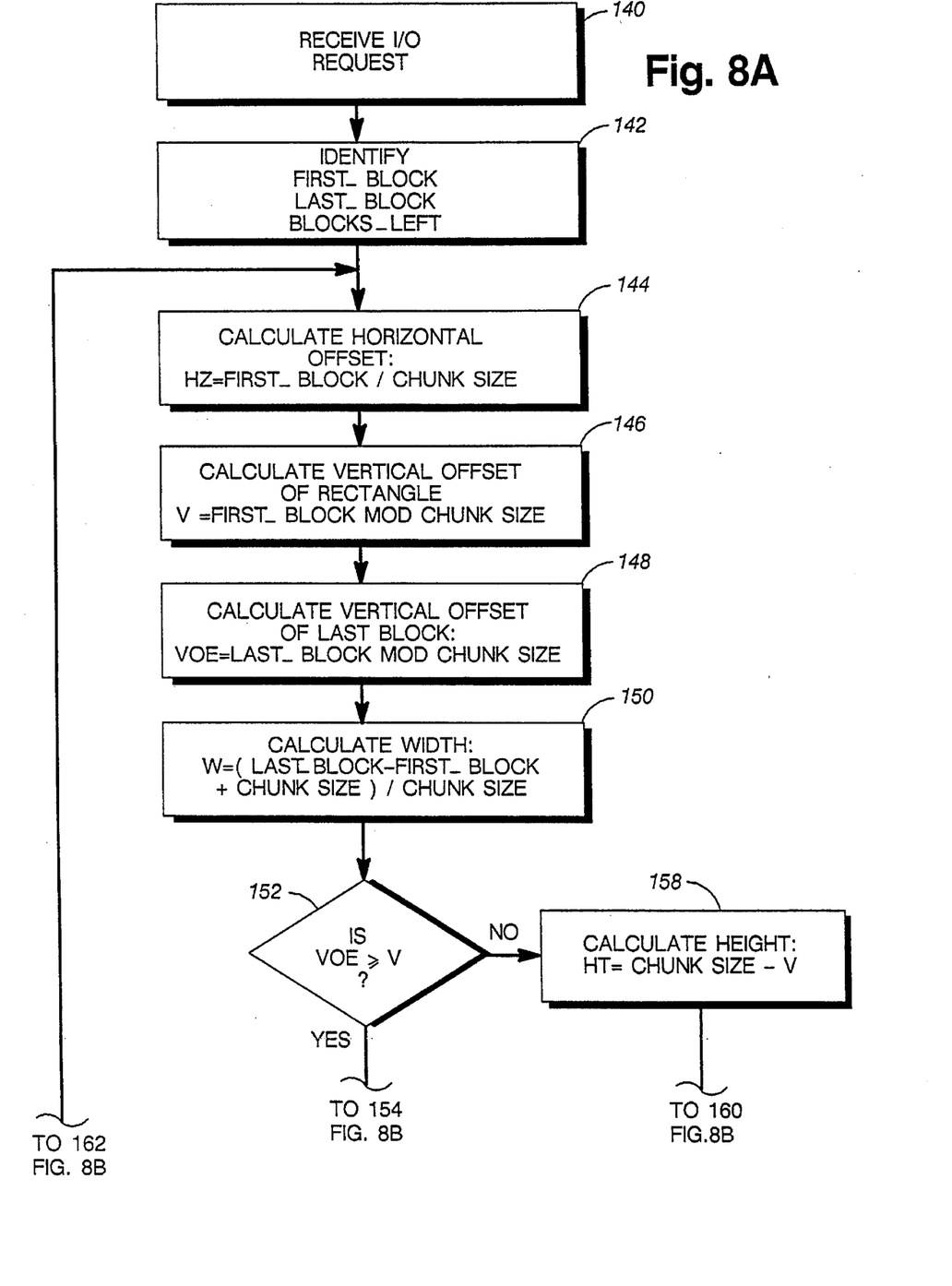
FIGS. 8A and 8B are flow charts illustrating the process of dividing an I/O request into individual I/O requests to data blocks forming rectangles in accord with the present invention.
Figure 8B:
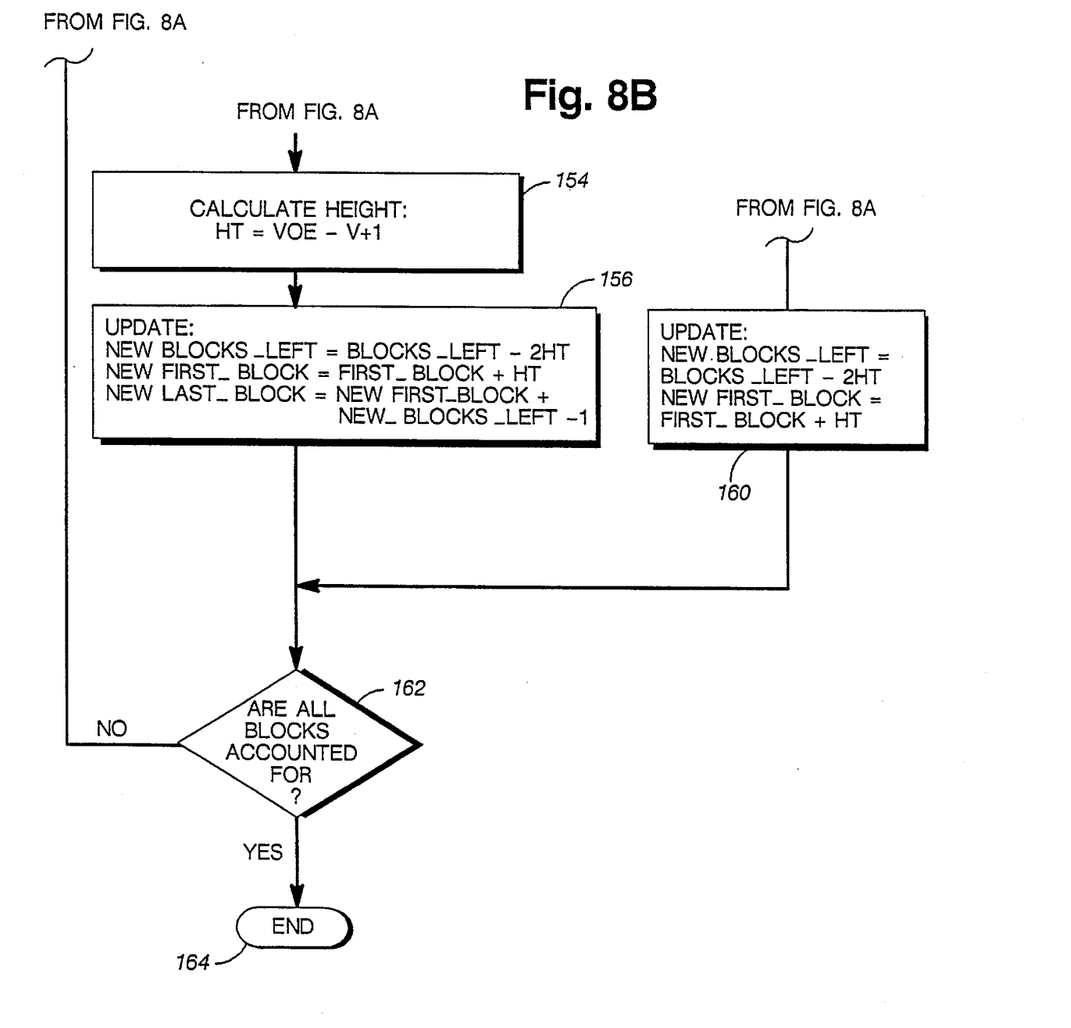

FIGS. 8A and 8B are flow charts which illustrate the process of forming rectangles according to the present invention. An I/O request from a user application, such as CPU 18 in FIG. 1 is received by the RAID controller 16 at step 140. The First Block (FB), the Last Block (LB) of the I/O request, and the Blocks Left (BL) are identified at step 142. The Horizontal Offset (HZ) of the first rectangle is calculated at step 144. The Horizontal Offset is calculated as the First Block divided by the Chunk Size. As is well known to those of ordinary skill in the field, these calculations are based upon integer division and apply the principals of Modulo Arithmetic. Next, the Vertical Offset (V) of the rectangle is calculated at step 146. The Vertical Offset is calculated as the First Block Mod Chunk Size. Next, the Vertical Offset of the Last Block (VOE) is calculated at step 148. The Vertical Offset of the Last Block (VOE) is calculated as the Last Block Mod Chunk Size. Now, the Width of the rectangle (W) is calculated at step 150. The Width is calculated as the sum of the Last Block minus the First Block plus the Chunk Size divided by the Chunk Size. If the Vertical Offset of the Last Block (VOE) is greater than or equal to Vertical Offset of the rectangle (V) at step 152, then the Height is calculated at step 154. The Height (HT) is calculated as the Vertical Offset of the Last Block minus the Vertical Offset of the rectangle plus 1. Now, at step 156, updates are made for the Blocks Left, the First Block and the Last Block. The new Blocks Left is equal to the Blocks Left minus twice the Height. The new First Block equals the First Block plus the Height. The new Last Block equals the new First Block plus the new Blocks Left minus one. If the Vertical Offset of the Last Block (VOE) is less than the Vertical Offset of the rectangle (V) at step 152, then the height is calculated at step 158. The Height (HT) is calculated as the Chunk Size minus the Vertical Offset of the rectangle. Now, at step 160, updates are made for the Blocks Left and the First Blocks. The new Blocks Left equals the Blocks Left minus twice the Height. The new First Blocks equals the First Block plus the Height. If all blocks are accounted for at step 162, the process ends at step 164. If some blocks remain, the process loops back to step 144 to determine the next rectangle. All of the blocks are accounted for at step 162 when the area of the rectangles that have been identified equals the number of blocks (area) within the strip I/O request.

For example, applying the process of FIGS. 8A and 8B to the strip shown in FIG. 4, at step 142, the First Block is three (FB=3) and the Last Block is forty-three (LB=43) and the Blocks Left is forty-one (BL=41). The Horizontal Offset is calculated at step 144 to be the First Block divided by the Chunk Size which is 3/12 or, in integer division, 0 (HZ=0). Now at step 146 the Vertical Offset of the rectangle is First Block Mod Chunk Size. Based upon the well known operating principals of modulo arithmetic the Vertical Offset is the remainder of three divided by twelve or three (V=3). At step 148 the Vertical Offset of the Last Block is Last Block Mod Chunk Size or the remainder of forty-three divided by twelve or seven (VOE=7). Now at step 150 the Width of the rectangle is the sum of the Last Block minus the First Block plus the Chunk Size divided by the Chunk Size or the sum of forty-three minus three plus twelve divided by twelve and, again using integer division, the Width is 4 (W=4). Now at step 152, the Vertical Offset of the Last Block (VOE=7) is greater than the Vertical Offset of the rectangle (V=3) and the Height is calculated at step 154 as Height equals the Vertical Offset of the Last Block (VOE=7) minus the Vertical Offset of the rectangle (V=3) plus 1 or the Height is five (HT=5). Next at step 156 the updates are made to the Blocks Left, the Last Block and the First Block. The new Blocks Left is the Blocks Left (BL=41) minus twice the Height (HT=5) or new Blocks Left is 31. The blocks 15–19 and 27–31 are counted as Blocks Left since they are contiguous with other remaining blocks, specifically blocks 14 and 20, 26 and 32. The new First Block is the First Block (FB=3) plus the Height (H=5) or new First Block is eight. The new Last Block is the new First Block (FB=8) plus the new Blocks Left (BL=31) minus 1 or new Last Block 38. At step 162 all the blocks have not been accounted for and, accordingly, the process repeats for the second rectangle in FIG. 4. At step 144 the Horizontal Offset is calculated to be zero (HZ=0). Now at step 146 the Vertical Offset of the rectangle is calculated to be eight (V=8). Next at step 148 the Vertical Offset of the Last Block using modulo arithmetic is calculated to be 2 (VOE=2), the remainder of the division of the Last Block by the Chunk Size or thirty-eight divided by twelve. Now the Width is calculated using integer division at step 150 to be 3 (W=3). Now since the Vertical Offset of the Last Block is not greater than the Vertical Offset of the rectangle the Height is calculated at step 158 to be 4 (HT=4). Now, at step 160, the new Blocks Left and the new First Block are determined. The new Blocks Left equals the Blocks Left (BL=31) minus twice the Height (HT=4) or the new Blocks Left is twenty-three. The new First Block equals the First Block (FB=8) plus the Height (HT=4) or the new First Block equals twelve. Now since there are blocks not accounted for at step 162 the process loops back to step 144.

Finally, the process repeats for the third rectangle beginning at step 144 to calculate the Horizontal Offset to be one (HZ=1). Now, the Vertical Offset of the rectangle at step 146 is calculated to be zero (V=0). The Vertical Offset of the Last Block is calculated to be two (VOE=2) at step 148. Now at step 150, the Width is calculated to be three (W=3). Now since at step 152 Vertical Offset of the Last Block (VOE) is greater than the Vertical Offset of the Rectangle (V), the Height is calculated to be three (HT=3) at step 154. Now, the new Blocks Left equals the Blocks Left (BL=23) minus twice the Height (HT=3) or new Blocks Left is seventeen. New First Block equals the First Block (FB=12) plus Height (H=3) or new First Block equals fifteen. The new Last Block equals the new First Block (FB=15) plus new Blocks Left (BL=17) minus 1 or new Last Block equals thirty-one. However, since all blocks are accounted for at step 162, the process ends at step 164 with three rectangles being identified.

Figure 9:
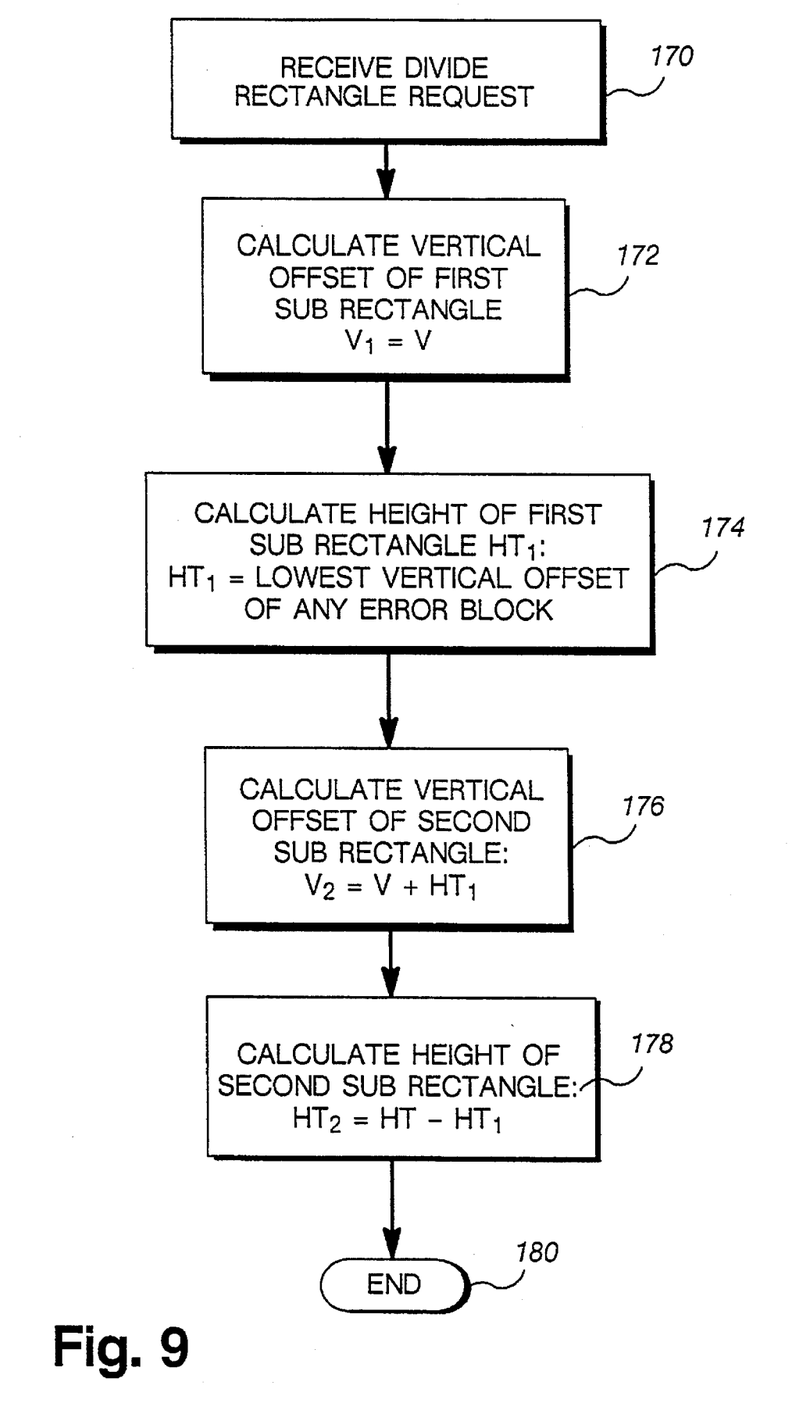
FIG. 9 is a flow chart illustrating the process of dividing or decomposing a rectangle into sub-rectangles or clone rectangles in accord with the present invention.

FIG. 9 is a flow chart which illustrates the process of forming sub-rectangles or clone rectangles according to the present invention. After dividing the I/O request for a strip into at most three rectangles and processing each rectangle as described in FIGS. 6 and 7 if a read rectangle or write rectangle request is unsuccessful, then that rectangle is divided or decomposed into two sub-rectangles. A request to divide the rectangle is received at step 170. Now, the Vertical Offset of the first sub-rectangle ($V_1$) is calculated to be the Vertical Offset of the rectangle (V) at step 172. Next, the Height of the first sub-rectangle ($HT_1$) is calculated to be the Lowest Vertical Offset into the rectangle of any error block at step 174. Next, at step 176, the Vertical Offset of the second sub-rectangle ($V_2$) is calculated as the Vertical Offset (V) of the rectangle plus the Height of the first rectangle ($HT_1$). Now, at step 178 the Height of the second rectangle ($HT_2$), the one containing the error block, is calculated as the Height of the rectangle minus the Height of the first sub-rectangle and the process ends at step 180.

Now, applying the above process to FIG. 5 which illustrates a rectangle from FIG. 4 with an error at block 40. The Vertical Offset of the first sub-rectangle $V_1$ is three, $V_1=3$. Next, the Height of the first sub-rectangle ($HT_1$) is equal to the Lowest Vertical Offset in the rectangle of any error block (block 40), $HT_1=1$. Now, the Vertical Offset of the second sub-rectangle is the Vertical Offset (V) of the rectangle plus the Height of the first sub-rectangle, $V_2=4$. The Height of the second sub-rectangle having the error block 40 is the Height of the rectangle (HT=5) minus the Height of the first sub-rectangle ($HT_1=1$) or $HT_2=4$. Following the above method the request to a rectangle that was unsuccessful is decomposed to requests to two sub-rectangles or clone rectangles.

A method of organizing a RAID-4 or RAID-5 implementation so that the complexity of the geometry of the data blocks responsive to an I/O request to a strip is reduced. Each I/O request to a strip is divided into at most three requests targeted to data blocks forming a rectangle. The number of different algorithms used to read and write from the rectangles is simplified compared to that needed for the complex geographic pattern of data blocks. If a data block within one of the rectangles is unavailable, then the request to that rectangle is subdivided again into two requests to data blocks forming smaller, non-overlapping rectangles which collectively are the original rectangle. Each of these sub- or clone rectangles is processed independently in order to simplify and manage the recovery from the error. The ability to recursively decompose a rectangle into other rectangles isolating a data block with an error permits the selection of fewer and less complicated ones of the well-known RAID algorithms.

What is claimed is:

1. In a data storage system having n+1 disks arranged into a RAID array, a plurality of data blocks forming a plurality of data chunks, a plurality of parity blocks forming a plurality of parity chunks, each of said parity chunks associated with n said data chunks, said parity chunks and said data chunks distributed over said n+1 disks, each one of said parity chunks and said associated said n forming a strip, a plurality of said strips forms said RAID array, a method of implementing I/O requests comprising the steps of:

receiving an I/O request from a user application and dividing said I/O request into a plurality of individual I/O requests, each individual I/O request confined to the boundaries of a strip;

determining whether each individual I/O request is targeted to data blocks forming a rectangle;

dividing an individual I/O request into at most three strip I/O requests, each strip I/O request targeted to data blocks forming a rectangle if the individual I/O request is not already targeted to data blocks forming a rectangle;

determining the state of the first one of said rectangles;

selecting an I/O algorithm for processing said first strip I/O request based on said determined state of said first one of said rectangles;

performing said selected I/O algorithm for processing said first strip I/O request;

determining the state of the next one of said rectangles;

selecting an I/O algorithm for processing said next strip I/O request based on said determined state of said next one of said rectangles;

performing said selected I/O algorithm for processing said next strip I/O request; and repeating the preceding three steps until all strip I/O requests have been processed.

2. In a data storage system having n+1 disks arranged into a RAID array, a plurality of data blocks forming a plurality of data chunks, a plurality of parity blocks forming a plurality of parity chunks, each of said parity chunks associated with n of said data chunks, said parity chunks and said data chunks distributed over said n+1 disks, each one of said parity chunks and said associated n data chunks forming a strip, a plurality of said strips forms said RAID array, a method of implementing I/O requests comprising the steps of:

(a) receiving a read I/O request from a user application and dividing said read I/O request into a plurality of individual read I/O requests, each individual read I/O request confined to the boundaries of a strip;

(b) determining whether one of said individual read I/O request is targeted to data blocks forming a rectangle;

(c) dividing said one of said individual read I/O requests into at most three strip read I/O requests, each strip read I/O request targeted to data blocks forming a rectangle if said individual read I/O request is not already targeted to data blocks forming a rectangle;

(d) determining the state of the first one of said rectangles;

(e) processing said first strip read I/O request using a simple read algorithm;

(f) determining the state of the next one of said rectangles;

(g) processing said next strip read I/O request using a simple read algorithm; and (h) repeating steps (f) and (g) until all strip read I/O requests for said individual read I/O request have been processed.

3. The method set forth in claim 2 further comprising the steps of:

repeating steps (b) through (h) until all individual read I/O requests have been processed.

4. The method set forth in claim 3 further comprising the steps of:

collecting all data read using said simple read algorithm; and sending said read data and a signal indicating a successful read I/O request to said user.

5. In a data storage system having n+1 disks arranged into a RAID array, a plurality of data blocks forming a plurality of data chunks, a plurality of parity blocks forming a plurality of parity chunks, each of said parity chunks associated with n of said data chunks, said parity chunks and said data chunks distributed over said n+1 disks, each one of said parity chunks and said associated n data chunks forming a strip, a plurality of said strips forms said RAID array, a method of implementing I/O requests comprising the steps of:

(a) receiving a read I/O request from a user application and dividing said read I/O request into a plurality of individual read I/O requests, each individual read I/O request confined to the boundaries of a strip;

(b) determining whether one of said individual read I/O request is targeted to data blocks forming a rectangle;

(c) dividing said one of said individual read I/O requests into at most three strip read I/O requests, each strip read I/O request targeted to data blocks forming a rectangle if said individual read I/O request is not already targeted to data blocks forming a rectangle;

(d) determining the state of the first one of said rectangles;

(e) processing said first strip read I/O request using a regenerate read algorithm if said first rectangle has unavailable data blocks;

(f) processing said first strip read I/O request using a simple read algorithm if said first rectangle does not have unavailable data blocks;

(g) determining the state of the next one of said rectangles;

(h) processing said next strip read I/O request using a regenerate read algorithm if said next rectangle has unavailable data blocks;

(i) processing said next strip read I/O request using a simple read algorithm if said next rectangle does not have unavailable data blocks;

(j) repeating steps (g) through (i) until all strip read I/O requests for said individual read I/O request have been processed.

6. The method set forth in claim 5, further comprising the steps of:

repeating steps (b) through (i) until all individual read I/O requests have been processed.

7. In a data storage system having n+1 disks arranged into a RAID array, a plurality of data blocks forming a plurality of data chunks, a plurality of parity blocks forming a plurality of parity chunks, each of said parity chunks associated with n of said data chunks, said parity chunks and said data chunks distributed over said n+1 disks, each one of said parity chunks and said associated n data chunks forming a strip, a plurality of said strips forms said RAID array, a method of implementing I/O requests comprising the steps of:

(a) receiving a read I/O request from a user application and dividing said read I/O request into a plurality of individual read I/O requests, each individual read I/O request confined to the boundaries of a strip;

(b) determining whether one of said individual read I/O request is targeted to data blocks forming a rectangle;

(c) dividing said one of said individual read I/O requests into at most three strip read I/O requests, each strip read I/O request targeted to data blocks forming a rectangle if said individual read I/O request is not already targeted to data blocks forming a rectangle;

(d) determining the state of the first one of said rectangles;

(e) processing said first strip read I/O request using a regenerate read algorithm if said first rectangle has unavailable data blocks;

(f) processing said first strip read I/O request using a simple read algorithm if said first rectangle does not have unavailable data blocks;

(g) if said simple read process was unsuccessful, determine if any slivers read successfully;

(h) if no slivers read successfully process said strip read I/O request using a regenerate read algorithm;

(i) if at least one sliver read successfully, divide said first rectangle into first and second clone rectangles;

(j) process said strip read I/O request to said second clone rectangle using a regenerate read algorithm;

(k) determine the state of the next one of said rectangles;

(l) processing said next strip read I/O request using a regenerate read algorithm if said next rectangle has unavailable data blocks;

(m) processing said next strip read I/O request using a simple read algorithm if said next rectangle does not have unavailable data blocks;

(n) if said simple read process was unsuccessful, determine if any slivers read successfully;

(o) if no slivers read successfully process said next strip read I/O request using a regenerate read algorithm;

(p) if at least one sliver read successfully, divide said next rectangle into first and second clone rectangles;

(q) process said strip read I/O request to said second clone rectangle using a regenerate read algorithm;

(r) repeating steps (k) through (q) until all strip read I/O requests for said individual read I/O request have been processed.

8. The method set forth in claim 7, further comprising the steps of:

repeating steps (b) through (r) until all individual read I/O requests have been processed.

9. In a data storage system having n+1 disks arranged into a RAID array, a plurality of data blocks forming a plurality of data chunks, a plurality of parity blocks forming a plurality of parity chunks, each of said parity chunks associated with n of said data chunks, said parity chunks and said data chunks distributed over said n+1 disks, each one of said parity chunks and said associated n data chunks forming a strip, a plurality of said strips forms said RAID array, a method of implementing I/O requests comprising the steps of:

(a) receiving an I/O write request from a user application and dividing said I/O write request into a plurality of individual I/O write requests, each individual I/O write request confined to the boundaries of a strip;

(b) determining whether one of said individual I/O write requests is targeted to data blocks forming a rectangle;

(c) dividing said one of said individual I/O write requests into at most three strip I/O write requests, each strip I/O write request targeted to data blocks forming a rectangle if the individual I/O write request is not already targeted to data blocks forming a rectangle;

(d) determining the state of the first one of said rectangles;

(e) if the number of blocks inside said first rectangle is greater than or equal to the number of blocks outside said first rectangle process said strip I/O write request using a reconstruct write algorithm;

(f) if the number of blocks inside said first rectangle is less than the number of blocks outside said first rectangle process said strip I/O write request using a read modify write algorithm;

(g) determining the state of the next rectangle;

(h) if the number of blocks inside said next rectangle is greater than or equal to the number of blocks outside said first rectangle process said strip I/O write request using a reconstruct write algorithm;

(i) if the number of blocks inside said first rectangle is less than the number of blocks outside said first rectangle process said strip I/O write request using a read modify write algorithm;

(j) repeat step (g) through (i) until all strip I/O write requests have been processed.

10. The method set forth in claim 9, further comprising the steps of:

repeating steps (b) through (j) until all individual I/O write requests have been processed.

11. In a data storage system having n+1 disks arranged into a RAID array, a plurality of data blocks forming a plurality of data chunks, a plurality of parity blocks forming a plurality of parity chunks, each of said parity chunks associated with n of said data chunks, said parity chunks and said data chunks distributed over said n+1 disks, each one of said parity chunks and said associated n data chunks forming a strip, a plurality of said strips forms said RAID array, a method of implementing I/O write requests comprising the steps of:

(a) receiving an I/O write request from a user application and dividing said I/O write request into a plurality of individual I/O write requests, each individual I/O write request confined to the boundaries of a strip;

(b) determining whether one of said individual I/O write requests is targeted to data blocks forming a rectangle;

(c) dividing said one of said individual I/O write requests into at most three strip I/O write requests, each strip I/O write request targeted to data blocks forming a rectangle if the individual I/O write request is not already targeted to data blocks forming a rectangle;

(d) process a strip I/O write request to a rectangle;

(e) if no slivers wrote successfully, repeat said write operation;

(f) if at least one sliver wrote successfully, divide said rectangle into first and second clone rectangles;

(g) repeat said write operation to said second clone rectangle;

(h) if a second write operation to said rectangle results in no slivers being written successfully;

(i) process said strip I/O write request using a reconstruct write algorithm or a read modify write algorithm.

12. The method set forth in claim 11, further comprising the step of:

repeating steps (d) through (i) until all strip I/O write requests for said individual I/O write request have been processed.

13. The method set forth in claim 12, further comprising:

repeating step (b) through (i) until all individual I/O write requests have been processed.

14. The method set forth in claim 13, further comprising:

sending a success signal to said user application if all write operations succeed; and identifying said successful blocks written and sending a write failure signal to said user application.

* * * * *